(12) United States Patent
Dooley et al.

(10) Patent No.: US 9,200,120 B2
(45) Date of Patent: Dec. 1, 2015

(54) BLANKET MATERIALS FOR INDIRECT PRINTING METHODS

(71) Applicant: XEROX CORPORATION, Norwalk, CT (US)

(72) Inventors: Brynn Mary Dooley, Toronto (CA); Carolyn P. Moorlag, Mississauga (CA); Anthony James Wigglesworth, Oakville (CA); Adrien Pierre Cote, Clarkson (CA); Yu Qi, Oakville (CA); Barkev Keoshkerian, Thornhill (CA)

(73) Assignee: XEROX CORPORATION, Norwalk, CT (US)

( * ) Notice: Subject to any disclaimer, the term of this patent is extended or adjusted under 35 U.S.C. 154(b) by 350 days.

(21) Appl. No.: 13/903,517

(22) Filed: May 28, 2013

(65) Prior Publication Data

US 2014/0354746 A1    Dec. 4, 2014

(51) Int. Cl.
*C08G 77/50* (2006.01)
*B05D 1/00* (2006.01)
(Continued)

(52) U.S. Cl.
CPC ............... *C08G 77/50* (2013.01); *B05D 1/005* (2013.01); *B05D 1/02* (2013.01); *B05D 1/18* (2013.01); *B05D 1/265* (2013.01); *B05D 1/28* (2013.01); *B05D 1/30* (2013.01); *B05D 3/067* (2013.01); *B05D 5/083* (2013.01); *B32B 33/00* (2013.01);
(Continued)

(58) Field of Classification Search
CPC ............ B41J 2/01; B41J 2/211; B41J 2/1433; B41J 2/17; B41J 2/17593; B41J 2/2107; B41J 2/1755; B41J 2/2114; B41J 11/0015; B41J 11/002; B41J 2/2056; B41J 2/21; B41J 2/0057; B41J 3/60; C09D 11/36; C09D 11/40; C09D 11/30; C09D 11/38; C09D 11/322; C09D 11/328; C09D 11/101; C09D 11/005; C09D 11/54; C09D 11/52; B41M 5/0011; B41M 5/0017; B41M 7/00; B41M 7/0072; B41M 5/52; B41M 5/5218
USPC .............................. 347/95–105, 88, 21, 20, 9
See application file for complete search history.

(56) References Cited

U.S. PATENT DOCUMENTS

| 4,150,181 A | * | 4/1979 | Smith | ........................... 427/444 |
| 5,240,774 A | * | 8/1993 | Ogawa et al. | .............. 428/411.1 |

(Continued)

OTHER PUBLICATIONS

U.S. Appl. No. 13/847,195, filed Mar. 19, 2013 to Dooley et al.

(Continued)

*Primary Examiner* — Manish S Shah
(74) *Attorney, Agent, or Firm* — Pillsbury Winthrop Shaw Pittman LLP (57) ABSTRACT

An intermediate transfer member containing a layer of a siloxyfluorocarbon networked polymer. A method of preparing an intermediate transfer member including mixing a coating solution containing siloxyfluorocarbon precursor materials; applying the coating solution as a sol on a substrate; curing the coating solution on the substrate to form an intermediate transfer member containing a layer of a siloxyfluorocarbon networked polymer. The surface free energy of the intermediate transfer member may be from about 10 mN/m to about 40 mN/m. A method of printing an image to a substrate includes applying an inkjet ink to an intermediate transfer member containing a layer of a siloxyflurocarbon networked polymer; spreading the ink onto the intermediate transfer member; inducing a property change of the ink; and transferring the ink to a substrate.

19 Claims, 3 Drawing Sheets

(51) Int. Cl.

| | | |
|---|---|---|
| *B05D 1/02* | (2006.01) | |
| *B05D 1/18* | (2006.01) | |
| *B05D 1/26* | (2006.01) | |
| *B05D 1/28* | (2006.01) | |
| *B05D 1/30* | (2006.01) | |
| *B05D 3/06* | (2006.01) | |
| *B05D 5/08* | (2006.01) | |
| *B32B 37/15* | (2006.01) | |
| *B32B 37/00* | (2006.01) | |
| *B32B 38/00* | (2006.01) | |
| *B41J 2/005* | (2006.01) | |
| *B32B 33/00* | (2006.01) | |
| *C09D 183/14* | (2006.01) | |

(52) U.S. Cl.
CPC ............ *B32B 37/153* (2013.01); *B32B 37/156* (2013.01); *B32B 38/00* (2013.01); *B41J 2/0057* (2013.01); *C09D 183/14* (2013.01); *B32B 2038/0076* (2013.01); *B32B 2307/748* (2013.01); *B32B 2310/0831* (2013.01); *B32B 2383/00* (2013.01)

(56) References Cited

U.S. PATENT DOCUMENTS

| | | | |
|---|---|---|---|
| 5,389,958 A * | 2/1995 | Bui et al. ............ | 347/103 |
| 5,641,568 A * | 6/1997 | Satoh et al. ............ | 428/332 |
| 5,844,020 A | 12/1998 | Paine et al. | |
| 5,952,402 A | 9/1999 | Paine et al. | |
| 6,042,227 A | 3/2000 | Meinhardt et al. | |
| 2005/0018027 A1 * | 1/2005 | Pan et al. ............ | 347/103 |
| 2007/0123606 A1 | 5/2007 | Toma et al. | |
| 2009/0046125 A1 | 2/2009 | Nystrom et al. | |
| 2010/0251914 A1 | 10/2010 | Zhou et al. | |
| 2010/0330305 A1 | 12/2010 | Wu | |
| 2011/0024422 A1 | 2/2011 | Valles et al. | |
| 2011/0104499 A1 | 5/2011 | Wu et al. | |
| 2011/0244202 A1 | 10/2011 | Wu et al. | |
| 2011/0244247 A1 | 10/2011 | Wu et al. | |
| 2012/0049121 A1 | 3/2012 | Wu | |
| 2012/0156481 A1 | 6/2012 | Moorlag et al. | |
| 2012/0157277 A1 | 6/2012 | Moorlag et al. | |
| 2012/0242749 A1 | 9/2012 | Moorlag et al. | |

OTHER PUBLICATIONS

U.S. Appl. No. 13/746,634, filed Jan. 22, 2013 to Dooley et al.
U.S. Appl. No. 13/746,910, filed Jan. 22, 2013 to Moorlag et al.
U.S. Appl. No. 13/746,920, filed Jan. 22, 2013 to Moorlag et al.
U.S. Appl. No. 13/746,686, filed Jan. 22, 2013 to Cote et al.
Mori et al., "Temperature Induced Changes in the Surface Wettability of SBR+PNIPA Film," 292 Macromol. Mater. Eng., vol. 917, pp. 917-922, 2007.
Galaev et al., "Thermoreactive water-soluble polymers, nonionic surfactants, and hydrogels as reagents in biotechnology," Enzyme Microb. Technol., May 1993, pp. 354-366, vol. 15, Butterworth-Heinemann.

* cited by examiner

BLANKET MATERIALS FOR INDIRECT PRINTING METHODS

TECHNICAL FIELD

The present disclosure is generally related to indirect printing methods, and more specifically, to intermediate transfer members and processes involving intermediate transfer members.

RELATED APPLICATIONS

U.S. Patent Application Publication No. 2012/0242749 to Moorlag et al. describes a topcoat layer for ink jet printer components comprising a cross-linked material comprised of siloxyfluorocarbon.

U.S. Patent Application Publication No. 2012/0156481 to Moorlag et al. describes a fuser member comprising a layer of a siloxyfluorocarbon networked polymer.

U.S. Patent Application Publication No. 2012/0157277 to Moorlag et al. describes a fuser member comprising an outer layer comprising a composite of a fluoropolymer and a networked siloxyfluorocarbon polymer.

U.S. patent application Publication Ser. No. 13/847,195 to Dooley et al. describes a formulation composition for preparing a print head face plate coating, the formulation composition comprising a sol comprising a mixture of monomers comprising at least one fluoroalkoxysilane monomer, a solvent, a catalyst, and water, wherein the formulation composition is stable towards gelation for more than 1.5 hours.

U.S. patent application Ser. No. 13/746,634 to Dooley et al. describes a crosslinked siloxane composition comprising a polymerization product of a mixture comprising from about 2 to about 12 alkoxysilane precursor materials, wherein at least one of the alkoxysilane precursor materials is a hydrophilic alkoxysilane precursor material, and at least one of the alkoxysilane precursor materials is a hydrophobic alkoxysilane precursor material.

U.S. patent application Ser. No. 13/746,910 to Moorlag et al. describes a polymer composition comprising a stimulus-responsive polymer dispersed in a base polymer matrix, wherein the surface free energy of the stimulus-responsive polymer is reversibly adjustable from a first surface free energy state to a second surface free energy state when heated to a predetermined critical activation temperature.

U.S. patent application Ser. No. 13/746,920 to Moorlag et al. describes a polymer composition comprising a first polymer layer comprising a base polymer matrix, and a second polymer layer grafted onto the first polymer layer, wherein the second polymer layer comprises a stimulus-responsive polymer, and the surface free energy of the stimulus-responsive polymer is reversibly adjustable from a first surface free energy state to a second surface free energy state when heated to a predetermined critical activation temperature.

U.S. patent application Ser. No. 13/746,686 to Côté et al. describes an intermediate image transfer member comprising a layer comprising a structured organic film (SOF) comprising a plurality of segments including at least a first segment type and a plurality of linkers comprising at least a first linker type arranged as a covalent organic framework (COF), wherein at least the first segment type contains fluorine.

The entire disclosures of the above-mentioned applications and patent application publications are totally incorporated herein by reference in their entireties.

BACKGROUND

Indirect printing methods generally include a two-step printing process involving first applying ink imagewise onto an intermediate transfer member (such as a drum or a belt) using an inkjet printhead to form a transient image, and then transferring the transient image to a substrate. When the ink is applied onto the intermediate transfer member (also called, for example, an intermediate receiving member, a blanket, or a transfix blanket), it wets or spreads to form a transient image. The transient image then undergoes a change in properties (such as partial or complete drying, thermal or photo-curing, gelation, and so forth), and is transferred to the substrate. An exemplary offset or indirect printing process is disclosed in U.S. Pat. No. 5,389,958, the entire disclosure of which is totally incorporated herein by reference.

Intermediate transfer members suitable for use in indirect printing desirably exhibit surface properties (such as energy, topology, and so forth) that meet the sub-system requirements of the inkjet/transfix printing architecture, including wetting of the ink and subsequently (such as after phase change or the like) transferring the transient image (that is, the residual ink film along with pigment) onto a substrate. Several classes of materials may be used to form intermediate transfer members, including silicone, fluorosilicone, and Viton. However, these are hydrophobic materials, and the inherent low surface tension of these materials precludes wetting of aqueous ink drops. A higher surface tension material may be used to form the intermediate transfer member, but the high surface tension of such materials would impede efficient transfer of the image from the intermediate transfer member.

Because the surface free energy requirements of the intermediate transfer member desirable for wetting the ink are different than those for transferring the transient image, intermediate transfer members that display good wettability do not efficiently transfer the ink film onto a substrate, and conversely, intermediate transfer members that efficiently transfer the image to the substrate do not wet the ink. Thus, to date, intermediate transfer members have not enabled both functions (that is, both wetting and transfer).

SUMMARY

The present disclosure provides an intermediate transfer member including a layer of a siloxyfluorocarbon networked polymer, where the surface free energy of the intermediate transfer member is from about 10 mN/m to about 40 mN/m.

The present disclosure also provides a method of preparing an intermediate transfer member, the method including mixing a coating solution comprising siloxyfluorocarbon precursor materials, applying the coating solution as a sol on a substrate, and curing the coating composition on the substrate to form an intermediate transfer member comprising a layer of a siloxyfluorocarbon networked polymer, where the surface free energy of a surface of the intermediate transfer member is from about 10 mN/m to about 40 mN/m.

Additionally, the present disclosure provides a method of printing an image to a substrate, the method including applying an inkjet ink to an intermediate transfer member using an inkjet printhead; spreading the ink onto the intermediate transfer member; inducing a property change of the ink; and transferring the ink to a substrate; where the intermediate transfer member comprises a layer of a siloxyfluorocarbon networked polymer; and the surface free energy of a surface of the intermediate transfer member is from about 10 mN/m to about 40 mN/m.

EMBODIMENTS

In this specification and the claims that follow, singular forms such as "a," "an," and "the" include plural forms unless the content clearly dictates otherwise.

As used herein, the modifier "about" used in connection with a quantity is inclusive of the stated value and has the meaning dictated by the context (for example, it includes at least the degree of error associated with the measurement of the particular quantity). When used in the context of a range, the modifier "about" should also be considered as disclosing the range defined by the absolute values of the two endpoints. For example, the range "from about 2 to about 4" also discloses the range "from 2 to 4."

The terms "hydrocarbon" and "alkane" refer, for example, to branched and unbranched molecules having the general formula $C_nH_{2n+2}$, in which n is a number of 1 or more, such as from about 1 to about 60, or from about 2 to about 30, or from about 4 to about 20. Exemplary alkanes include methane, ethane, n-propane, isopropane, n-butane, isobutene, tort-butane, octane, decane, tetradecane, hexadecane, eicosane, tetracosane, and the like. Alkanes may be substituted by replacing hydrogen atoms with one or more functional groups to form alkane derivative compounds.

The term "functional group" refers, for example, to a group of atoms arranged in a way that determines the chemical properties of the group and the molecule to which it is attached. Examples of functional groups include halogen atoms, hydroxyl groups, carboxylic acid groups, and the like.

In general, fluorinated organosiloxane networks (fOSNs) are highly crosslinked hybrid networked materials containing fluorocarbon chains bound together via silane linkages. These materials exhibit high thermal robustness and high mechanical strength. The surface and mechanical properties of a fluorinated organosiloxane network can be tailored for particular applications by selecting suitable building blocks and coating formulations. That is to say, the fluorinated organosiloxane networks according to the instant disclosure are tunable materials whose properties can be varied through the selection of the type and amount of particular precursors used to produce the fluorinated organosiloxane network. The tunability of fluorinated organosiloxane networks makes them an attractive materials platform for low-surface free energy coatings for blanket materials. For example, in embodiments, the surface free energy of the fluorinated organosiloxane networks according to the instant disclosure is tunable, and can range, for example, form about 10 mN/m to about 40 mN/m, such as from about 15 mN/m to about 40 mN/m, or from about 19 mN/m to about 30 mN/m.

The present disclosure provides an intermediate transfer member containing a layer of a siloxyfluorocarbon networked polymer, which may be used, for example, in indirect printing methods. For example, the intermediate transfer members of the instant disclosure may, in embodiments, contain a layer of a siloxyfluorocarbon networked polymer, where the siloxyfluorocarbon networked polymer has a fluorine content of from about 20 weight percent to about 70 weight percent, such as from about 25 weight percent to about 65 weight percent, or from about 30 weight percent to about 60 weight percent, based on the total weight of the siloxyfluorocarbon networked polymer. In embodiments, the properties of the siloxyfluorocarbon networked polymer (and the intermediate transfer member containing a layer of a siloxyfluorocarbon networked polymer) may be adjusted by increasing or decreasing the fluorine content of the siloxyfluorocarbon networked polymer. The surface free energy of the intermediate transfer members according to the instant disclosure may therefore be tuned by adjusting the fluorine content of the siloxyfluorocarbon networked polymer, such as to achieve a desired surface free energy to balance between wetting ability and transfer capabilities of an intermediate transfer member used in an indirect printing process. That is to say, by tuning the fluorine content of the siloxyfluorocarbon networked polymer, the surface free energy of the intermediate transfer members of the instant disclosure may be adjusted to differing surface energies, and the surface release properties of the intermediate transfer members may be tailored to provide an enabling surface with an array of wetting properties available for the changing physical characteristics of the ink as wetting progresses through jetting, spreading, and transfer.

Moreover, the highly networked siloxyfluorocarbon networked polymers yield intermediate transfer members having excellent thermal stability—that is to say, the siloxyfluorocarbon networked polymer layer according to the instant disclosure does not degrade at temperatures up to about 300° C., and is stable at higher temperatures (such as, for example, at temperatures up to about 305° C., or up to about 320° C., or up to about 350° C.). For example, in embodiments, the siloxyfluorocarbon networked polymer according to the instant disclosure is stable at temperatures from about 300° C. to about 350° C., or from about 305° C. to about 350° C., or from about 320° C. to about 350° C., depending on the system. The intermediate transfer members according to the instant disclosure also exhibit good non-stick interactions when exposed to molten ink and toner, such that ink, toner, and other printing-related materials do not adhere to the intermediate transfer member, and may be rolled along the surface and off the siloxyfluorocarbon networked polymer layer of the intermediate transfer member without streaking or trailing. The intermediate transfer members according to the instant disclosure also have robustness to surface wear, and strong adhesion to substrates (thereby enabling primer-free application).

Indirect Printing

Figure 1:
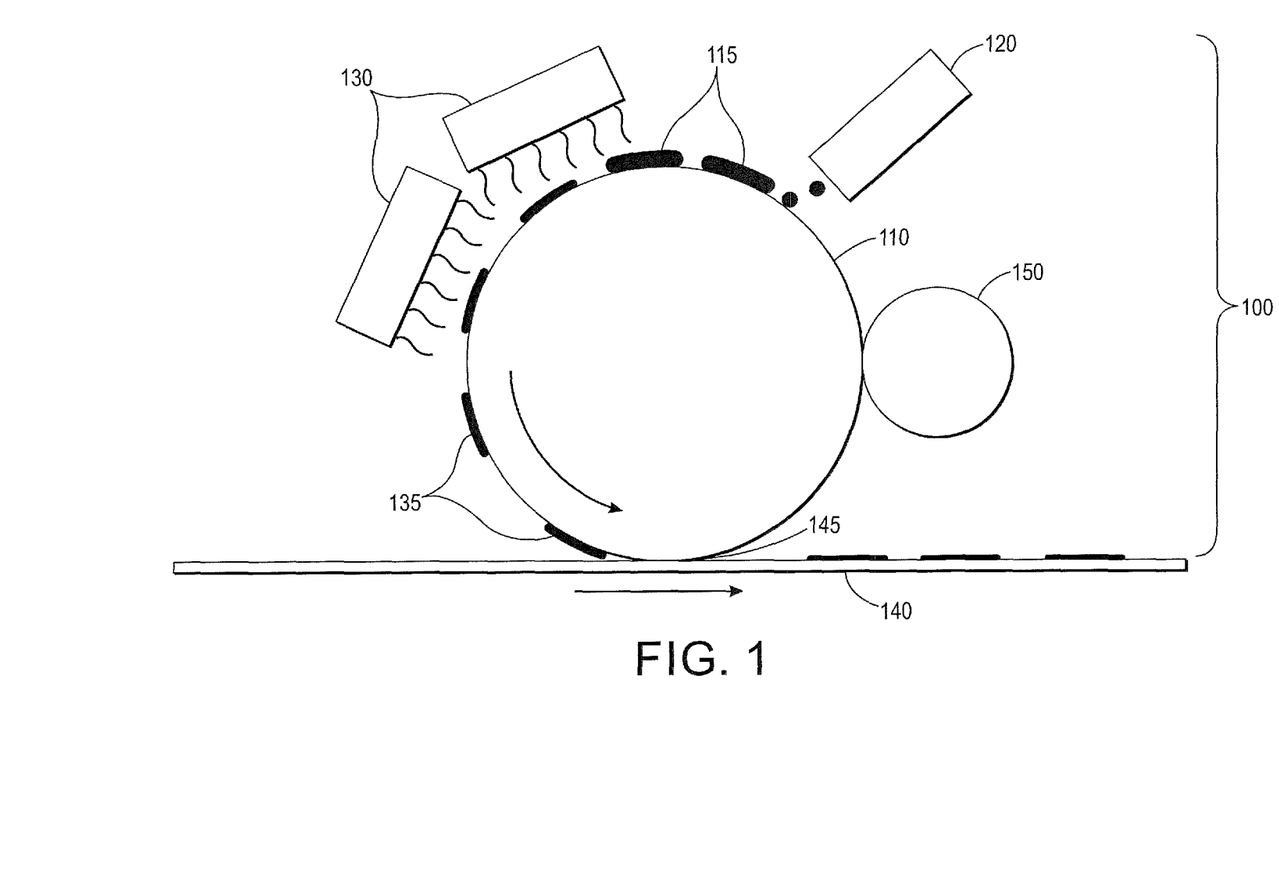
FIG. 1 is a schematic representation of a two-step printing process.

FIG. 1 shows one embodiment of a printing apparatus according to the present disclosure. The printing apparatus 100 comprises an intermediate transfer member 110. In the illustrated embodiment, the intermediate transfer member is a cylinder (such as a drum); however, the intermediate transfer member may be in alternate forms. For example, the intermediate transfer member may be in the form of an endless flexible belt, a web, a flexible drum or roller, a rigid roller or cylinder, a sheet, a drelt (a cross between a drum and a belt), a seamless belt—that is, with an absence of any seams or visible joints in the members—and the like.

In some embodiments, the intermediate transfer member 110 rotates counterclockwise. The apparatus includes an inkjet printhead 120, which applies ink imagewise onto the intermediate transfer member 110. The ink wets and spreads on the intermediate transfer member 110 to form the transient image 115. The transient image 115 then undergoes a change in properties (such as partial or complete drying, thermal or photo-curing, gelation, and so forth). The change in properties may be induced, for example, by a property-change device 130. The property-change device 130 may be any suitable device which may induce a change in properties in the transient image 115. Potentially suitable property-change devices may include, for example, a device that irradiates light, such as a UV lamp or an ultraviolet LD (laser diode) array, or a chiller or an air-cooling device, or a heat source, such as a heat lamp, an optical heating device such as a laser or an LED bar, a thermal print head, resistive heating fingers, or a microheater array, or the like.

After the image undergoes a change in properties, the resulting post-phase-change transient image 135 may be transferred to a recording medium or printing substrate 140. Potentially suitable recording media or printing substrates may include paper, substrate, transparency material such as polyester, polycarbonate, and the like, cloth, wood, and any other desired material upon which an image may be situated. The intermediate transfer member 110 may undergo a change in properties to further enable transfer. In the depicted embodiment, the recording medium or printing substrate 140, such as paper, may be fed to a nip region 145 in the direction of the arrow. The ink image may then be transferred from the intermediate transfer member 110 to the printing substrate 140. A cleaning unit 150 may clean the intermediate transfer member 110 of any residual ink, dust, or other materials after transfer of the ink images has been completed.

In embodiments, an indirect printing process according to the instant disclosure may use an intermediate transfer member comprising a layer of a siloxyfluorocarbon networked polymer. In embodiments, the surface release properties of the intermediate transfer member may be tailored by adjusting the fluorine content of the intermediate transfer member (such as, for example, by adjusting the fluorine content of the layer containing an siloxyfluorocarbon networked polymer). For example, in embodiments, the surface free energy of the crosslinked siloxane composition is tunable, and can range, for example, from about 10 mN/m to about 40 mN/m, such as from about 15 mN/m to about 30 mN/m, or from about 19 mN/m to about 25 mN/m.

Surface free energy may be calculated, for example, using the Lewis acid-base method. Lewis acid-base theory is given by the following equation for the solid-liquid interfacial energy:

$$\gamma_j(1+\cos\theta_j) = 2(\gamma_s^{LW}\gamma_j^{LW})^{1/2} + 2(\gamma_s^-\gamma_j^+)^{1/2} + 2(\gamma_s^+\gamma_j^-)^{1/2}$$

where (LW), (+), and (−) are the dispersive, acid and base components of the SFE index, and j refers to liquids 1, 2, 3. $\theta_j$ is the contact angle of the jth liquid on the substrate. $\theta_j$ is the surface tension of liquid j, and subscript s refers to the solid.

Intermediate Transfer Member

An intermediate transfer member suitable for the above two-step printing process desirably has surface properties (such as energy, topology, and so forth) both to enable wetting of the ink and to enable complete transfer of the transient image (residual ink film along with pigment) onto a substrate. For the ink to wet well (i.e., spread) onto the intermediate transfer member, the surface free energy of the surface of the intermediate transfer member is desirably higher than the surface tension of the liquid ink. For the ink to subsequently be transferred from the intermediate transfer member to the substrate, the surface free energy of the surface of the intermediate transfer member is desirably lower than the surface free energy of the dry (resin) ink.

As a general matter, the wettability or spread of a liquid on a surface is governed by the forces of interaction between the liquid, the surface, and the surrounding air, and in particular the surface free energy, as relating to the surface chemistry and surface topology. Surface tension is a parameter that can be described as the interaction between the forces of cohesion and the forces of adhesion, which determines whether or not wetting, or the spreading of liquid across a surface, occurs.

Young's Equation, which defines the balance of forces caused by a wet drop on a dry surface, is written as:

$$\gamma_{SL} + \gamma_{LV}\cos\theta = \gamma_{SV}$$

where $\gamma_{SL}$ are the forces of interaction between a solid and liquid; $\gamma_{LV}$ are the forces of interaction between a liquid and surrounding air; $\gamma_{SV}$ are the forces of interaction between a solid and surrounding air; and $\theta$ is the contact angle of the drop of liquid in relation to the surface. Young's Equation also indicates that, if the surface tension of the liquid is lower than the surface energy, the contact angle is zero and the liquid wets the surface. The surface energy depends on several factors, such as the chemical composition and crystallographic structure of the solid, and in particular of its surface, the geometric characteristics of the surface and its roughness, and the presence of molecules physically adsorbed or chemically bonded to the solid surface.

According to the instant disclosure, the intermediate transfer member contains a crosslinked siloxane composition comprising a fluorinated organosiloxane network (fOSN). fOSNs are composed of networked precursors containing reactive alkoxysilane groups attached to fluorocarbon chains. Processing of alkoxysilane precursors by sol-gel synthesis initiates crosslinking to yield a highly chemically bound material system. In the fOSN system, siloxane groups will bond efficiently to substrates such as steel and polyimide, while low surface energy fluorocarbon chains contribute to an anti-stick surface. The present fOSN compositions can be used to produce an intermediate transfer member whereby molten inks, such as dry inks, solid inks or UV curable inks, and toner do not adhere to the surface of the intermediate transfer member, thus enabling efficient transfer of an image to a substrate.

Figure 2:
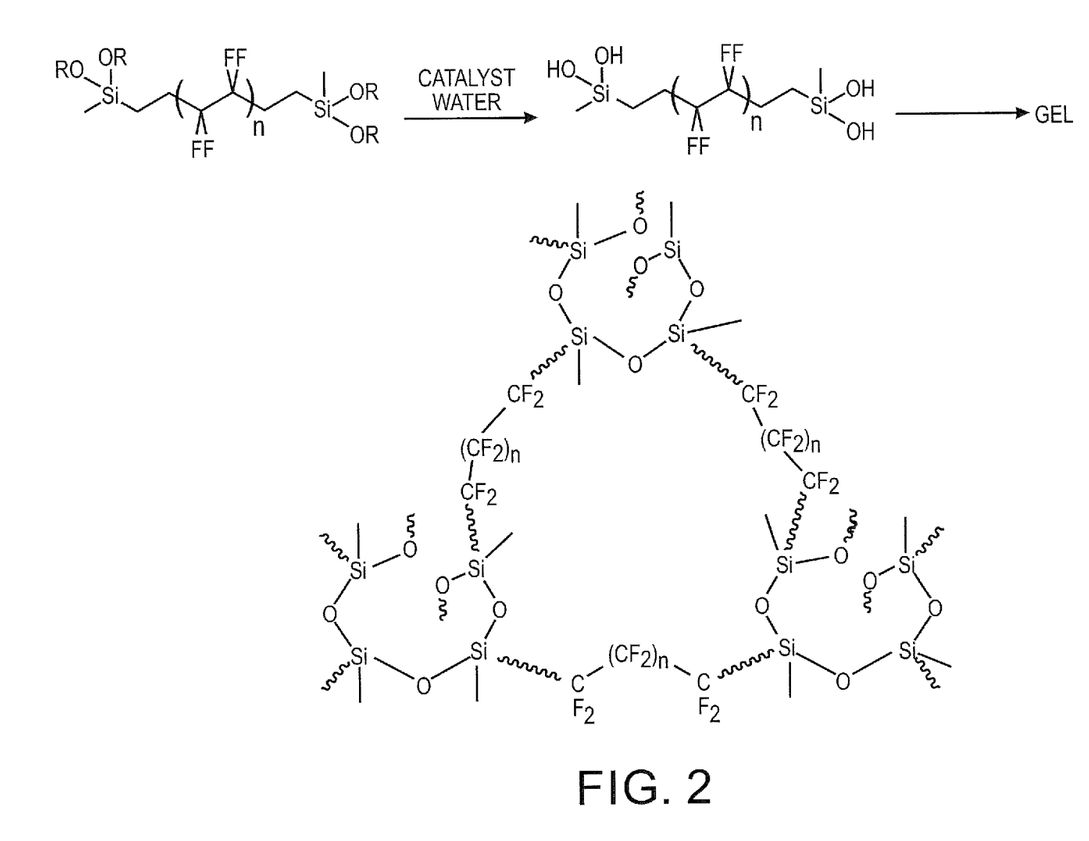
FIG. 2 is a reaction scheme illustrating the synthesis of an exemplary fluorinated organosiloxane network through a sol-curable process according to the instant disclosure.

In embodiments, the instant disclosure provides an intermediate transfer member that includes a fluorinated organosiloxane networked polymer. The fluorinated alkoxysilane precursors contain reactive alkoxysilane functional groups which are networked by sol-gel processing, as shown in FIG. 2, where n is determined by the precursors used to prepare the siloxyfluorocarbon networked polymer, and may be a number of from about 1 to about 20, such as from about 2 to about 16, or from about 2 to about 10. fOSN precursors incorporate fluorinated chains to add flexibility and impart low-surface energy to the resulting material. A variety of fOSN precursors with varying siloxane and fluorocarbon components may be used to prepare coatings, including di- and tri-alkoxy silanes, linear and branched fluoroalkanes, fluoroarenes, and mixtures thereof.

Siloxyfluorocarbon monomers are crosslinked via sol-gel chemistry, where hydrolysis and condensation of alkoxide or hydroxide groups occurs and upon curing at elevated temperatures, produces a coating used on fusing surfaces. The siloxyfluorocarbon networked polymer can withstand high temperature conditions without melting or degradation, is mechanically robust under such conditions, and displays good release under such conditions.

Monofunctional, difunctional, or trifunctional silane end groups may be used to prepare a fluorinated organosiloxane networked polymer. Siloxyfluorocarbon monomers are represented by the structure:

wherein $R_1$ is an aliphatic or aromatic fluorocarbon chain; L is a $C_aH_{2a}$ linker group, where a is a number between 0 and about 10, such as from about 1 to about 8, or from about 2 to about 6; and $X_1$, $X_2$, and $X_3$ are reactive hydroxide functionalities, reactive alkoxide functionalities, unreactive aliphatic functionalities of from about 1 carbon atom to about 10 carbon atoms, such as from about 2 carbon atoms to about 8 carbon atoms, or from about 3 carbon atoms to about 6 carbon atoms, or unreactive aromatic functionalities including from about 3 carbon atoms to about 10 carbon atoms, such as from about 4 carbon atoms to about 9 carbon atoms, or from about 5 carbon atoms to about 8 carbon atoms.

In addition to the monomers listed above, the siloxyfluorocarbon networked polymer can be prepared using monomers having the following structure:

wherein $R_2$ represents a fluorocarbon chain, which may be aliphatic, aromatic, or contain mixtures of aliphatic or aromatic fluorocarbon chains; L is a $C_aH_{2a}$ linker group, where a is a number between 0 and about 10, such as from about 1 to about 8, or from about 2 to about 6; and $X_1$, $X_2$, and $X_3$ are as defined above.

In embodiments, a siloxyfluorocarbon networked polymer may be prepared using from 0 to about 100 weight percent monosubstituted fluoroalkoxysilane (relative to disubstituted silane), such as from 0 to about 80 weight percent monosubstituted fluoroalkoxysilane, or from 5 to about 70 weight percent monosubstituted fluoroalkoxysilane, or from about 10 to about 50 weight percent monosubstituted fluoroalkoxysilane. In embodiments, wherein the fluorinated organosiloxane networked polymer comprises monosubstituted fluoroalkoxysilane monomers and disubstituted fluoroalkoxysilane monomers, where the monosubstituted fluoroalkoxysilane monomers are incorporated into the fluorinated organosiloxane networked polymer in an amount of from about 0 to about 50 weight percent relative to the disubstituted fluoroalkoxysilane monomers, or in an amount of from about 0.5 to about 50 weight percent relative to the disubstituted fluoroalkoxysilane monomers, or in an amount of from about 5 to about 50 weight percent relative to the disubstituted fluoroalkoxysilane monomers.

In addition to the monomers listed above, the formulation composition may be prepared using monomers selected from the group consisting of silicon tetraalkoxide and branched pentasilanes. The silicon tetraalkoxide may be generally represented by the respective structure:

where R may be hydrogen, methyl, ethyl, propyl, isobutyl, other hydrocarbon groups, or mixtures thereof. The branched pentasilanes may be generally represented by the respective structure:

where $X_1$, $X_2$, and $X_3$ are as defined above.

The siloxyfluorocarbon networked polymer comprises a fluorine content of from about 20 weight percent to about 70 weight percent, such as from about 25 weight percent to about 65 weight percent, or from about 30 weight percent to about 60 weight percent, based on the total weight of the siloxyfluorocarbon networked polymer. The silicon content, by weight, in the siloxyfluorocarbon networked polymer is from about 1 weight percent silicon to about 20 weight percent silicon, or from about 1.5 weight percent silicon to about 15 weight percent silicon or from about 2 weight percent silicon to about 10 weight percent silicon, based on the total weight of the siloxyfluorocarbon networked polymer.

The monomers are networked together so that all monomers are molecularly bonded together in the cured composition via silicon oxide (Si—O—Si) linkages. Therefore, a molecular weight cannot be given for the siloxyfluorocarbon networked polymer because the composition is crosslinked into one system.

In embodiments, one can use metal alkoxide (M being a metal, such as Si, Al, Ti, and the like) functionalities as cross-linking components between fluorocarbon chains. For cross-linking to occur efficiently throughout the composite, bifunctional fluorocarbon chains may be used. Mono-functional fluorocarbon chains may also be added to enrich fluorination content. Trifluoromethyl ($CF_3$) terminated chains may align at the surface to reduce surface energy and improve release.

Examples of precursors that may be used to form a composite system include silicon tetraalkoxide and siloxane-terminated fluorocarbon chains and are shown below. Siloxane-based sol-gel precursors are commercially available. The addition of a silicon tetraalkoxide (such as a silicon tetraalkoxide, below) introduces extra cross-linking and robustness to the material, but is not necessary to form the sol-gel/fluorocarbon composite system.

Silicon Tetra- alkoxide

Siloxane-terminated Fluorocarbon Chains

Fluorocarbon chains include readily available dialkene precursors which can then be converted to silanes via hydrosilation (Reaction 1, below). Monofunctional fluorinated siloxane chains are commercially available as methyl or ethyl siloxanes, or could be converted from chlorosilane or dialkene precursors.

Reaction 1: Preparation of Fluorocarbon chain silicon alkoxide precursors

Shown below are some fluorinated and siloxane precursors that are commercially available. Fluorocarbon and siloxane materials are available from a variety of vendors including Gelest, Synquest, Apollo Scientific, Fluorochem, TCI America, Anachemica, Lancaster Synthesis Inc., and Polysciences Inc.

Solvents used for sol gel processing of siloxyfluorocarbon precursors and coating of layers include organic hydrocarbon solvents, and fluorinated solvents. Alcohols such as methanol, ethanol, and isopropanol may be used to promote sol-gel reactions in solution. Further examples of solvents include ketones such as methyl ethyl ketone and methyl isobutyl ketone. Mixtures of solvents may be used. The solvent system included the addition of a small portion of water, such as from about 1 molar equivalent to 10 molar equivalents of water compared to siloxyfluorocarbon precursors or the siloxane terminated fluorocarbons, or from about 2 molar equivalents to about 8 molar equivalents of water, or from about 3 to about 6 molar equivalents of water.

Upon the addition of water to the solution of sol gel precursors, alkoxy groups react with water, and condense to form agglomerates that are partially networked, and are referred to as a sol. Upon coating of the partially networked sol onto a substrate, a gel is formed upon drying, and with subsequent heat treatment, the fully networked fOSN coating (siloxyfluorocarbon networked polymer) is formed on the substrate.

In embodiments, the siloxyfluorocarbon networked polymer does not dissolve when exposed to solvents (such as ketones, chlorinated solvents, ethers, etc.) and does not degrade at temperatures up to about 300° C., and is stable at higher temperatures (such as, for example, at temperatures up to about 305° C., or up to about 320° C., or up to about 350° C.). For example, in embodiments, the siloxyfluorocarbon networked polymer according to the instant disclosure is stable at temperatures from about 300° C. to about 350° C., or from about 305° C. to about 350° C., or from about 320° C. to about 350° C., depending on the system. For example, in embodiments, following heating in air at about 300° C. for 30 minutes, the weight loss of the siloxyfluorocarbon networked polymer may be less than about 5%, such as less than about 3%, or less than about 2%, or less than about 1.5%. The siloxyfluorocarbon networked polymer exhibits good release when exposed to a wide variety of inks, toner, or other contaminants, such that ink, toner, and other printing-related materials do not adhere to the intermediate transfer member. In embodiments, following heat treatment of ink jetted onto the intermediate transfer member, a wide variety of inks may be rolled along the surface and off the coating without streaking or trailing. In embodiments, the siloxyfluorocarbon networked polymer provides the intermediate transfer member with sliding angle characteristics such that droplets of ink, such as UV curable ink and solid ink, landing on the intermediate transfer member exhibit a sliding angle of from about 5° to about 25° with the intermediate transfer member having the siloxyfluorocarbon networked polymer, such as from about 5° to about 20°, or from about 5° to about 15°.

Any suitable substrate may be used. In embodiments, the substrate may include, for example, metals, rubbers, and fabrics. Metals include, for example, steel, aluminum, nickel, and their alloys. Examples of suitable rubbers may include ethylene propylene dienes, fluoroelastomers, n-butyl rubbers, silicone rubbers and other elastomers and the like. The term "a fabric material" refers, for example, to a textile structure comprised of mechanically interlocked fibers or filaments, which may be woven or nonwoven. Fabrics may be materials made from fibers or threads and woven, knitted, or pressed into a cloth or felt type structures. The term "woven" may refer, for example, to fibers or filaments closely oriented by warp and filler strands at right angles to each other. The term "nonwoven" may refer, for example, to randomly integrated fibers or filaments. Examples of fabrics may include, for instance, woven or nonwoven cotton fabric, graphite fabric, fiberglass, woven or nonwoven polyimide (for example, KEVLAR™, available from DuPont), woven or nonwoven polyamide, such as nylon or polyphenylene isophthalamide (for example, NOMEX™, of E. I. DuPont of Wilmington, Del.), polyester, aramids, polycarbonate, polyacryl, polystyrene, polyethylene, polypropylene, cellulose, polysufone, polyxylene, polyacetal, and the like, and mixtures thereof. The substrate may have a thickness of from about 1 to about 70 mm, such as from about 10 to about 65 mm, or from about 30 to about 60 mm.

Figure 3:
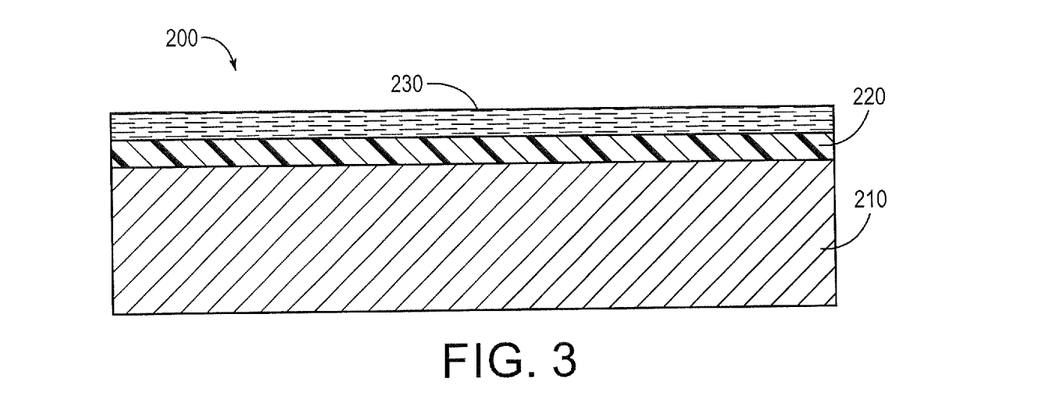
FIG. 3 depicts an exemplary intermediate transfer member according to embodiments of the instant disclosure.

In embodiments, the intermediate transfer member may include a substrate having one or more functional layers formed thereon. In embodiments, the fOSN layer may be disposed as an outer layer on the functional layer. Thus, in embodiments, the intermediate transfer member may contain a substrate, one or more functional layers formed on the substrate, and an fOSN layer disposed on the one or more functional layers. For example, FIG. 3 depicts an exemplary intermediate transfer member 200 having a substrate 210 with one or more functional layers (for example, functional layer 220) and an outer surface fOSN layer 230 formed thereon.

Examples of functional layers (such as functional layer 220) include fluorosilicones, silicone rubbers such as room temperature vulcanization (RTV) silicone rubbers, high temperature vulcanization (HTV) silicone rubbers, and low temperature vulcanization (LTV) silicone rubbers. These rubbers are known and readily available commercially, such as SILASTIC® 735 black RTV and SILASTIC® 732 RTV, both from Dow Corning; 106 RTV Silicone Rubber and 90 RTV Silicone Rubber, both from General Electric; and JCR6115CLEAR HTV and SE4705U HTV silicone rubbers from Dow Corning Toray Silicones. Other suitable silicone materials include the siloxanes (such as polydimethylsiloxanes); fluorosilicones such as Silicone Rubber 552, available from Sampson Coatings, Richmond, Va.; liquid silicone rubbers such as vinyl cross-linked heat curable rubbers or silanol room temperature cross-linked materials; and the like. Another specific example is Dow Corning Sylgard 182. Commercially available LSR rubbers include Dow Corning Q3-6395, Q3-6396, SILASTIC® 590 LSR, SILASTIC® 591 LSR, SILASTIC® 595 LSR, SILASTIC® 596 LSR, and SILASTIC® 598 LSR from Dow Corning. The functional layers provide elasticity and can be mixed with inorganic particles, for example SiC or $Al_2O_3$, as desired.

Examples of the functional layer (such as functional layer 220) may also include fluoroelastomers. Fluoroelastomers are from the class of 1) copolymers of two of vinylidenefluoride, hexafluoropropylene, and tetrafluoroethylene; such as those known commercially as VITON A®, 2) terpolymers of vinylidenefluoride, hexafluoropropylene, and tetrafluoroethylene such as those known commercially as VITON B®; and 3) tetrapolymers of vinylidenefluoride, hexafluoropropylene, tetrafluoroethylene, and a cure site monomer, such as those known commercially as VITON GH® or VITON GF®. These fluoroelastomers are known commercially under various designations such as those listed above, along with VITON E®, VITON E 60C®, VITON E430®, VITON 910®, and VITON ETP®. The VITON® designation is a trademark of E.I. DuPont de Nemours, Inc. The cure site monomer can be 4-bromoperfluorobutene-1,1,1-dihydro-4-bromoperfluorobutene-1,3-bromoperfluoropropene-1,1,1-dihydro-3-bromoperfluoropropene-1, or any other suitable, known cure site monomer, such as those commercially available from DuPont. Other commercially available fluoropolymers include FLUOREL 2170®, FLUOREL 2174®, FLUOREL 2176°, FLUOREL 2177 and FLUOREL LVS 76®, FLUOREL® being a registered trademark of 3M Company. Additional commercially available materials include AFLAS™ a poly(propylene-tetrafluoroethylene), and FLUOREL II® (LII900) a poly(propylene-tetrafluoroethylenevinylidenefluoride), both also available from 3M Company, as well as the tecnoflons identified as FOR-60KIR®, FOR-LHF®, NM® FOR-THF®, FOR-TFS®, TH®, NH®, P757®, TNS®, T439®, PL958®, BR9151® and TN505®, available from Ausimont.

The fluoroelastomers VITON GH® and VITON GF® have relatively low amounts of vinylidenefluoride. The VITON GF® and VITON GH® have about 35 weight percent of vinylidenefluoride, about 34 weight percent of hexafluoropropylene, and about 29 weight percent of tetrafluoroethylene, with about 2 weight percent cure site monomer. In embodiments, the thickness of the functional layer may be from about 10 to about 500 microns, such as from about 15 to about 200 microns, or from about 20 to about 100 microns.

Application of an fOSN layer may be carried out by any suitable method. Exemplary methods for depositing the fOSN layer on the substrate include draw-down coating, spray coating, spin coating, flow coating, dipping, spraying such as by multiple spray applications of very fine thin films, casting, web-coating, roll-coating, painting, extrusion molding, laminating, or the like. In embodiments, this coating does not require a fluorinated solvent.

In embodiments, a solution of fluorinated alkoxysilane monomers in ethanol or another alcohol, such as methanol or isopropanol, or mixture containing alcohol may be used as the coating solution, and may be prepared with the addition of about 1-10 molar equivalents of water and a catalytic amount of acid or base to initiate networking, such as from about 0.01 to about 0.1 molar equivalents of acid or base, or from about 0.02 to about 0.09 molar equivalents of acid or base, or from about 0.04 to about 0.08 molar equivalents of acid or base. In embodiments, the acid may be selected from the group consisting of hydrochloric acid, hydrobromic acid, perchloric acid, nitric acid, sulfuric acid, acetic acid, formic acid, and mixtures thereof. In embodiments, the base may be selected from the group consisting of sodium hydroxide, ammonium hydroxide, methylamine, and mixtures thereof. In embodiments, the fluorocarbon containing silicon alkoxide groups may be present in an amount of, for example, from about 5 to about 70 percent by weight of the total weight of the coating solution, the alcohol solvent may be present in an amount of from about 30 to about 95 percent by weight of the total weight of the coating solution, such as from about 40 to about The inherent strength of this ceramic/fluorocarbon hybrid and self-adhesion to surfaces makes fOSN a good candidate for primer-free application. As shown in Table 1, fOSN coatings on silicone substrates has been found to display surface energy values slightly higher than that of polyfluoro-alkoxy (PFA), and about the same magnitude as a fluoroelastomer available under the trade name VITON (available from E. I. du Pont de Nemours and Company (Wilmington, Del.)). It has been shown that surface energy is decreased significantly with extension of the fluorocarbon chain length of the precursor and corresponding increase in fluorine content. The surface energy can be modified by the choice of precursor.

| Networked Material | Structure | Fluorine Content (%) | Surface Free Energy* (mN/m$^2$) |
|---|---|---|---|
| Disiloxyfluorohexane | [chemical structure] | 48 | 23.46 |
| Disiloxyfluorooctane | [chemical structure] | 53 | 21.29 |
| Viton-GF | [chemical structure] Wherein n = 20-70%, m = 20-60%, and o = 0-40% (by weight). | 71 | 22.93 |
| PFA | [chemical structure] Wherein n = 1-5%, and m = 95-99% (by weight). | 75 | 19.75 |

90 percent by weight, or from about 50 to about 80 percent by weight; the water may be present in an amount of from about 1 molar equivalent to about 10 molar equivalents of water compared to siloxyfluorocarbon precursors or the siloxane terminated fluorocarbons, or from about 2 molar equivalents to about 6 molar equivalents of water; and the catalyst may be present in an amount of from about 0.01 to about 0.1 molar equivalents of acid or base, or from about 0.02 to about 0.09 molar equivalents of acid or base, or from about 0.04 to about 0.08 molar equivalents of acid or base. However, as discussed above, in embodiments, the solvent may also be a solvent other than an alcohol.

In embodiments, after coating, the organosiloxane layer may be air-dried and heat-treated at a temperature of, for example, from about 80° C. to about 300° C., or from about 100° C. to about 250° C., or from about 125° C. to about 200° C. In embodiments, following air-drying and heat-treatment, the orgnaosiloxane layer will network to yield an fOSN coating. The siloxane functionalities of an fOSN sol will self-bond to form the network, and also bond to a variety of substrates. Siloxy functionalities will bind to substrates of metals, ceramics, and polymers. The thickness of the fOSN layer may be from about 3 to about 600 microns thick, such as from about 5 to about 400 microns, or from about 10 to about 250 microns thick.

Ink Materials

Any ink suitable for use in an indirect printing method may be used. Exemplary ink compositions include, for example, phase change inks, gel based inks, curable inks, aqueous inks, and solvent inks. The term "ink composition" may refer, for example, to all colors of a particular ink composition including, for example, usable color sets of an ink composition. For example, an ink composition may refer to a usable color set of phase change ink that includes cyan, magenta, yellow, and black inks. Therefore, as defined herein, cyan phase change ink and magenta phase change ink are different ink colors of the same ink composition.

The term "phase change ink," also referred to as "solid ink," may refer, for example, to inks that remain in a solid phase at ambient temperature and that melt to a liquid phase when heated above a threshold temperature, referred to in some instances as a melt temperature. The ambient temperature is the temperature of the air surrounding the imaging device; however, the ambient temperature may be at room temperature (about 20° C. to about 25° C.) when the imaging device is positioned in an enclosed or otherwise defined space. Melt temperatures for phase change ink may be, for example, from about 70° C. to about 140° C., such as from about 80° C. to about 100° C., or from about 110° C. to about 130° C. When phase change ink cools below the melt temperature, the ink returns to the solid phase.

The terms "gel ink" and "gel based ink" may refer, for example, to inks that remain in a gelatinous state at the ambient temperature and that may be heated or otherwise altered to have a different viscosity suitable for ejection by a printhead. Gel ink in the gelatinous state may have a viscosity, for example, between from about 100,000 to about 100,000,000 centipose (cP), such as from about 200,000 to about 50,000,000 cPs, or from about 300,000 to about 10,000,000 cPs. However, the viscosity of gel ink may be reduced to a liquid-like viscosity by heating the ink above a threshold temperature, referred to as a gelation temperature. The gelation temperature may be, for example from about 30° C. to about 50° C., such as from about 31° C. to about 38° C., or from about 41° C. to about 48° C. The viscosity of the gel ink increases when the ink cools below the gelation temperature.

Some ink compositions, referred to herein as curable inks, may be cured by the imaging device. The process of "curing" ink may refer, for example, to curable compounds in an ink undergoing an increase in molecular weight in response to being exposed to radiation. Exemplary processes for increasing the molecular weight of a curable compound include, for example, crosslinking and chain lengthening Cured ink is suitable for document distribution, is resistant to smudging, and may be handled by a user. Radiation suitable to cure ink may encompass the full frequency (or wavelength) spectrum including, for example, microwaves, infrared, visible, ultraviolet, and x-rays. For instance, ultraviolet-curable gel ink, referred to herein as UV gel ink, becomes cured after being exposed to ultraviolet radiation. The terms "ultraviolet" or "ultraviolet radiation" may refer, for example, to radiation having a wavelength of from about 50 nm to about 500 nm.

In embodiments, an ink suitable for use in the above-described two-step printing process may have surface tension, viscosity, and particle size suitable for use in a piezoelectric inkjet printhead. In embodiments, the surface tension of the jettable ink may be from about 15 to about 50 dynes/cm, such as from about 18 to about 45 dynes/cm, or from about 20 to about 40 dynes/cm, or from about 22 to about 32 dynes/cm. The viscosity of the jettable inks may be, for example, from about 1 to about 30 centipoise (cps) at 30° C., such as from about 3 to about 20 cps, or from about 5 to about 18 cps, or from about 6 to about 17 cps. In embodiments, the particle size of the jettable inks may be less than about 600 nm, such as from about 10 nm to about 550 nm, or from about 100 nm to about 500 nm.

EXAMPLES

The following examples are being submitted to illustrate embodiments of the present disclosure. These examples are intended to be illustrative only and are not intended to limit the scope of the present disclosure. Parts and percentages are by weight unless otherwise indicated.

Formulations containing 0-50 weight % monosubstituted perfluoroalkoxysilane (relative to the disubstituted Anne) were prepared. The alkoxysilane mixture was dissolved in n-butanol or n-butanol/cyclopentanol mixtures to give a 40 to 75 weight percent formulation. One molar equivalent of water and 0.5-1.0 mol % hydroxide ion catalyst (tetrabutylammonium hydroxide) were added to induce sol formation. The sols were stable (no significant change in viscosity) for more than 2 hours.

Hard coatings were prepared by filtering the sol and draw down coating the formulation on UPILEX® (polyimide) substrate. The coatings were immediately cured at 160 or 180° C. for 30 minutes or 1 hour, yielding uniform 1-2 μm, clear, colorless films.

Ink-fOSN interactions have been qualitatively evaluated (24 hours exposure to molten phase change ink; short term exposure to UV gel ink) and quantitatively evaluated (phase change ink contact and sliding angle, long term phase change ink soak). Following exposure to molten ink all solid inks could be rolled along the surface and off the coating without streaking or trailing. Qualitative antiwetting tests reveal both phase change and UV inks display no permanent adhesion to the surface of a fluorinated organosiloxane network coating.

It will be appreciated that various of the above-disclosed and other features and functions, or alternatives thereof, may be desirably combined into many other different systems or applications. Also, various presently unforeseen or unanticipated alternatives, modifications, variations or improvements therein may be subsequently made by those skilled in the art, and are also intended to be encompassed by the following claims.

What is claimed is:

1. An intermediate transfer member comprising a layer of a siloxyfluorocarbon networked polymer prepared from siloxyfluorocarbon monomers represented by the structure:

wherein $R_1$ is an aliphatic or aromatic fluorocarbon chain; L is a $C_aH_{2a}$ linker group, where a is a number between 0 and about 10; and $X_1$, $X_2$, and $X_3$ are reactive hydroxide functionalities, reactive alkoxide functionalities, unreactive aliphatic functionalities of from about 1 carbon atom to about 10 carbon atoms, or unreactive aromatic functionalities including from about 3 carbon atoms to about 10 carbon atoms, wherein the surface free energy of the intermediate transfer member is from about 10 mN/m to about 40 mN/m to provide wetting of an ink applied to the intermediate transfer member and further wherein the intermediate transfer member exhibits no permanent adhesion of ink to the layer of siloxyfluorocarbon networked polymer.

2. The intermediate transfer member according to claim 1, wherein the siloxyfluorocarbon networked polymer is prepared from monomers represented by the structure:

wherein $R_2$ represents a fluorocarbon chain, which may be aliphatic, aromatic, or contain mixtures of aliphatic or aromatic fluorocarbon chains; L is a $C_aH_{2a}$ linker group, where a is a number between 0 and about 10; and $X_1$, $X_2$, and $X_3$ are reactive hydroxide functionalities, reactive alkoxide functionalities, unreactive aliphatic functionalities of from about 1 carbon atom to about 10 carbon atoms, or unreactive aromatic functionalities including from about 3 carbon atoms to about 10 carbon atoms.

3. The intermediate transfer member according to claim 1, wherein the siloxyfluorocarbon networked polymer is prepared from monosubstituted fluoroalkoxysilane monomers and disubstituted fluoroalkoxysilane monomers, the monosubstituted fluoroalkoxysilane monomers being present in an amount of from about 0.1 to about 50 weight percent relative to the disubstituted fluoroalkoxysilane monomers.

4. The intermediate transfer member according to claim 1, wherein the intermediate transfer member has a weight loss of less than about 5% after heating for 30 minutes at a temperature of from about 300° C. to about 350° C.

5. The intermediate transfer member according to claim 1, wherein the fluorine content of the siloxyfluorocarbon networked polymer is from about 20% to about 70% by weight, based on the total weight of the siloxyfluorocarbon networked polymer.

6. The intermediate transfer member according to claim 1, wherein the surface free energy of the intermediate transfer member may be adjusted by increasing or decreasing the fluorine content of the siloxyfluorocarbon networked polymer.

7. The intermediate transfer member according to claim 1, further comprising:
a substrate; and
a functional layer disposed on the substrate;
wherein the layer comprising a siloxyfluorocarbon networked polymer is disposed as an outer layer on the functional layer.

8. The intermediate transfer member according to claim 7, wherein the functional layer comprises an elastomer material.

9. The intermediate transfer member according to claim 7, wherein the layer comprising a siloxyfluorocarbon networked polymer has a thickness of from about 3 to about 600 microns.

10. A printing apparatus comprising an intermediate transfer member according to claim 1.

11. A method of preparing an intermediate transfer member, the method comprising:
mixing a coating solution comprising siloxyfluorocarbon precursor materials;
applying the coating solution as a sol on a substrate; and
curing the coating composition on the substrate to form an intermediate transfer member comprising a layer of a siloxyfluorocarbon networked polymer prepared from siloxyfluorocarbon monomers represented by the structure:

wherein $R_1$ is an aliphatic or aromatic fluorocarbon chain; L is a $C_aH_{2a}$ linker group, where a is a number between 0 and about 10; and $X_1$, $X_2$, and $X_3$ are reactive hydroxide functionalities, reactive alkoxide functionalities, unreactive aliphatic functionalities of from about 1 carbon atom to about 10 carbon atoms, or unreactive aromatic functionalities including from about 3 carbon atoms to about 10 carbon atoms;
wherein the surface free energy of a surface of the intermediate transfer member is from about 10 mN/m to about 40 mN/m to provide wetting of an ink applied to the intermediate transfer member and further wherein the intermediate transfer member exhibits no permanent adhesion of ink to the layer of siloxyfluorocarbon networked polymer.

12. The method according to claim 11, wherein the coating solution further comprises a catalyst, water, and an organic solvent.

13. The method according to claim 11, wherein the coating solution is applied using an application technique selected from the group consisting of draw-down coating, spray coating, painting, dipping, brush coating, roll coating, extrusion molding, spin coating, laminating, casting, and flow coating.

14. The method according to claim 12, wherein the solvent is selected from the group consisting of alcohols, ketones, and mixtures thereof.

15. The method according to claim 12, wherein an amount of water is from about 1 to about 10 molar equivalents of water to the siloxyfluorocarbon precursor materials.

16. A method of printing an image to a substrate, the method comprising:
applying an inkjet ink to an intermediate transfer member using an inkjet printhead;
spreading the ink onto the intermediate transfer member;
inducing a property change of the ink; and
transferring the ink to a substrate;
wherein the intermediate transfer member comprises a layer of a siloxyfluorocarbon networked polymer prepared from siloxyfluorocarbon monomers represented by the structure:

wherein $R_1$ is an aliphatic or aromatic fluorocarbon chain; L is a $C_aH_{2a}$ linker group, where a is a number between 0 and about 10; and $X_1$, $X_2$, and $X_3$ are reactive hydroxide functionalities, reactive alkoxide functionalities, unreactive aliphatic functionalities of from about 1 carbon atom to about 10 carbon atoms, or unreactive aromatic functionalities including from about 3 carbon atoms to about 10 carbon atoms; and
the surface free energy of a surface of the intermediate transfer member is from about 10 mN/m to about 40 mN/m wherein the surface free energy of the intermediate transfer member is from about 10 mN/m to about 40 mN/m to provide wetting of an ink applied to the intermediate transfer member and further wherein the intermediate transfer member exhibits no permanent adhesion of ink to the layer of siloxyfluorocarbon networked polymer.

17. The method of printing an image to a substrate according to claim 16, wherein the fluorine content of the siloxyfluorocarbon networked polymer is from about 20% to about 70% by weight of the siloxyfluorocarbon networked polymer.

18. The method of printing an image to a substrate according to claim 16, wherein the intermediate transfer member was prepared by
mixing a coating solution comprising siloxyfluorocarbon precursor materials;
applying the coating solution as a sol on a substrate; and
curing the coating composition on the substrate to form an intermediate transfer member comprising a layer of a siloxyfluorocarbon networked polymer.

19. The method of printing an image to a substrate according to claim 16, wherein the intermediate transfer member further comprises a substrate and a functional layer disposed on the substrate, wherein the layer of the siloxyfluorocarbon networked polymer is disposed as an outer layer on the functional layer.

* * * * *